Patented Oct. 18, 1949

2,485,175

UNITED STATES PATENT OFFICE 2,485,175

METHOD OF RECOVERING HARD METAL CARBIDES FROM SINTERED MASSES

George Joseph Trapp, Leamington Spa, England

No Drawing. Application June 3, 1946, Serial No. 674,041. In Great Britain June 7, 1945

12 Claims. (Cl. 23—208)

This invention relates to treatment of sintered masses comprising a hard metal carbide, for example tungsten carbide, and a metallic bond (usually cobalt) such as are employed as tips for cutting tools and also as ammunition cores. The invention is particularly concerned with the recovery of the hard metal carbides and the metallic bond from such sintered masses.

In view of the high cost of raw materials used in the production of such masses, attempts have been made to develop economic methods of recovering the carbide and the metal bond from reject or other unserviceable sintered masses, particularly ammunition cores, where the quantities involved are relatively great. Their hardness and high compressive strength, however, have rendered unprofitable and impracticable processes involving crushing or other kind of mechanical reduction of sintered masses as such. Dissolution of the metal bond has also proved to involve real difficulty, owing to the very limited penetration achieved by solvents. Recovery processes involving the initial conversion of the masses to oxide are lengthy and costly.

The primary object of the invention is to provide a practicable and inexpensive process to facilitate the recovery of the hard metal carbide and the bond metal from sintered masses.

A further object of the invention is to provide a process whereby the hard metal carbide and the bond metal are recovered in a form in which they are easily re-usable for the production of new sintered hard metal components.

A further object of the invention is to provide a process whereby a high proportion of the hard metal carbide and the bond metal are recovered.

According to the invention such sintered masses are heated to a temperature above the melting point of the bond metal in a non-oxidising, preferably reducing, atmosphere. This causes the masses to swell, crack and become porous throughout. Some of the bond metal may exude. The sintered masses thus become completely permeable by acid and by reason of the porosity a very large area of bond metal becomes exposed to attack.

After cooling the masses are treated with acid to remove bond metal. With the removal of the bond metal the sintered masses completely lose the normal characteristics of a cemented hard metal and are readily subject to mechanical reduction.

Taking tungsten carbide by way of example, the initial production of sintered masses necessitates ball milling of tungsten metal powder with carbon to reduce the particle size of the tungsten metal as much as possible and to ensure intimate admixture with the carbon. The mixture is then heated to form tungsten carbide. This is again ball milled with cobalt metal powder in order to reduce the particle size of the tungsten carbide and to ensure intimate admixture with the cobalt. Tungsten carbide recovered by the process described herein is not physically changed and the effect of the original ball milling is retained so that it has been found that when using recovered tungsten carbide to produce new sintered masses the time of ball milling with cobalt can be reduced to one third of the time required with new tungsten carbide.

The sintered masses contain a certain amount of free carbon. During the high temperature treatment which is the first stage of the process herein described the free carbon reacts with any free tungsten which may be present to form carbide so that the recovered carbide has a high combined carbon content. The high temperature treatment also causes certain impurities which may be present in the sintered masses to volatilise. Other impurities are dissolved in the later acid treatment, so that the recovered tungsten carbide is a fine powder of high purity and may be of better quality than that used in the production of the original sintered masses.

Experimental operation of the process has shown that at least 95 per cent of the original tungsten carbide and cobalt contents of sintered masses can be recovered.

The following is an example of a convenient way of carrying the invention into effect, as applied by way of example to ammunition cores containing tungsten carbide bonded with some 12 per cent of cobalt.

The ammunition cores were heated in a furnace to a temperature of 1,800° C., a reducing atmosphere being maintained during the heat treatment. In a short time the cores became swollen and cracked and some of the bond metal had exuded. They were allowed to cool and then boiled in hydrochloric acid until reaction was complete. After washing to remove chlorides the cores were reduced by crushing to a size convenient for milling. Then by further reduction in a ball mill, a finely powdered tungsten carbide suitable for use in manufacture of sintered hard metal masses was obtained. The product was of relatively high purity with a combined carbon content of 6.04 per cent. Pure mono-tungsten carbide WC has a theoretical carbon content of approximately 6.08 per cent.

The cobalt was available for recovery from the hydrochloric acid solution and the first washings as the chloride.

Although described with particular reference to sintered masses consisting of tungsten carbide and cobalt the process is applicable to sintered masses containing other hard metal carbides, or mixtures of such carbides, and bond metals other than cobalt.

What I claim is:

1. A process of recovering hard metal carbide and a metallic bond from a sintered mass of such materials, wherein the mass is heated to a temperature above the melting point of the metallic bond in a non-oxidising atmosphere, whereby the mass is caused to swell and crack and to become porous, and such porous mass is treated with acid for the removal of the metallic bond.

2. A process as claimed in claim 1, wherein the sintered mass is heated in a reducing atmosphere.

3. A process as claimed in claim 1, wherein the acid acting upon the porous mass is heated.

4. A process of recovering hard metal carbide and a metallic bond from a sintered mass of such materials, wherein the mass is heated to a temperature above the melting point of the metallic bond in a non-oxidising atmosphere, whereby some of the metallic bond is exuded and the mass is made porous, the porous mass is then cooled and treated with acid for the removal of the metallic bond, and the resultant mass of hard metal carbide is subjected to mechanical reduction.

5. A process as claimed in claim 4, wherein the sintered mass is heated in a reducing atmosphere.

6. A process as claimed in claim 4, wherein the acid acting upon the porous mass is heated.

7. A process of recovering hard metal carbide and a metallic bond from a sintered mass of such materials, wherein the mass is heated in a non-oxidising atmosphere to cause swelling and cracking of the mass to make it porous, the porous mass being then cooled and treated with acid to remove the metallic bond therefrom, and the resultant mass of hard metal carbide is subjected to mechanical reduction.

8. A process as claimed in claim 7, wherein the sintered mass is heated in a reducing atmosphere.

9. A process as claimed in claim 7, wherein the acid acting upon the porous mass is heated.

10. A process of recovering tungsten carbide and a metallic bond from a sintered mass of these materials, wherein the mass is heated to a temperature of the order of 1800° C. in a non-oxidizing atmosphere, whereby some of the metallic bond is exuded and the mass is made porous, the porous mass being then cooled and treated with acid for the removal of the metallic bond and the resultant mass of hard metal carbide is subjected to mechanical reduction and the bonding metal recovered from the solution.

11. A process for recovering tungsten carbide from a sintered mass thereof with cobalt, wherein the mass is heated to a temperature of at least 1800° C. whereby some of the cobalt bond is exuded and the mass is made porous, the porous mass being then cooled and treated with acid for the removal of the cobalt bond and the resultant mass of hard metal carbide subjected to mechanical reduction.

12. A process as claimed in claim 11, wherein the cobalt is also recovered from the solution obtained with the acid treatment.

GEORGE JOSEPH TRAPP.

REFERENCES CITED

The following references are of record in the file of this patent:

UNITED STATES PATENTS

| Number | Name | Date |
| --- | --- | --- |
| 2,285,909 | Dawihl | June 9, 1942 |
| 2,407,752 | Trent | Sept. 17, 1946 |

OTHER REFERENCES

Lange, "Handbook of Chemistry," Handbook Publishers, Inc., Sandusky, Ohio (1944), pp. 180-181.